United States Patent [19]

Eonomoto et al.

[11] Patent Number: 4,960,551
[45] Date of Patent: Oct. 2, 1990

[54] METHOD OF PRODUCING MODIFIED LEAD BARIUM TITANATE CERAMIC USEFUL AS PTC THERMISTOR

[75] Inventors: Takamitsu Eonomoto; Hiroshi Ueda; Midori Kawahara; Naoki Okada; Noboru Murata, all of Ube, Japan

[73] Assignee: Central Glass Company, Limited, Ube City, Japan

[21] Appl. No.: 273,811

[22] Filed: Nov. 21, 1988

[30] Foreign Application Priority Data

Nov. 28, 1987 [JP] Japan ................................ 62-298919

[51] Int. Cl.$^5$ .............................................. C04B 35/46
[52] U.S. Cl. ........................................ 264/65; 501/96; 501/138
[58] Field of Search ....................... 264/65; 501/96, 138

[56] References Cited

FOREIGN PATENT DOCUMENTS 50-33490  3/1975  Japan .
60-258901 12/1985  Japan .

Primary Examiner—James Derrington

Attorney, Agent, or Firm—Fleit, Jacobson, Cohn, Price, Holman & Stern

[57] ABSTRACT

A modified lead barium titanate ceramic which has a fundamental composition of $(Ba_{1-x-y}Sb_yPb_x)TiO_3$, where x is not greater than 0.9 and usually not smaller than 0.6 and y is from 0.001 to 0.1, and has a high positive temperature coefficient of resistivity (PTCR) over a range of temperature higher than about 350° C. at the lower boundary, is produced by using a metal salt of an organic acid such as lead titanate salt of oxalic acid as the source of Pb and by adding at least one of $BaCO_3$, $SiO_2$, BN and $TiO_2$ to the raw materials of the above fundamental composition. After thermally decomposing the organic acid metal salt the mixture of the raw materials including the additive(s) is compacted and sintered. By this method the sintering is achieved with good reproducibility and with little dissipation of lead, and the obtained titanate ceramic is good and durable in the PTCR characteristics and hence is useful as the material of a PTC thermistor functioning at medium-to-high temperatures.

6 Claims, 3 Drawing Sheets

METHOD OF PRODUCING MODIFIED LEAD BARIUM TITANATE CERAMIC USEFUL AS PTC THERMISTOR

BACKGOUND OF THE INVENTION

This invention relates to a method of producing a modified lead barium titanate semiconductive ceramic having a positive temperature coefficient of resistivity (PTCR) over a range of temperature within the range from about 350° C. to about 500° C.

There are some PTC (positive temperature coefficient) thermistors using a modified lead barium titanate semiconductive ceramic which exhibits a considerable increase in its resistance as the temperature increases above a switching temperature. PTC thermistors have wide uses such as, for example, limiting currents, generating heat at a constant temperature, starting motors and degaussing television sets.

In general modified lead barium titanate ceramics having PTCR are produced by a sintering method using titanium oxide, barium oxide or carbonate and lead oxide as the principal materials and, in addition, a very small amount of a suitable compound of a selected substitutional metal such as La, Ce, Y, Sb, Bi or Nb. Such a substitutional metal is introduced for improvement of the PTCR characteristics of the titanate ceramics.

For a modified lead barium titanate ceramic having PTCR it is necessary that the content of lead is suficiently high. In practice, however, it is not easy to produce a lead barium titanate with high content of lead because lead oxide in the raw materials is liable to partly dissipate during the sintering operation which needs to be performed at a temperature higher than 1000° C. Even if an excess quantity of lead oxide is used it is difficult to accurately realize the intended composition of the sintered titanate. Besides deviation from the intended composition, there arises another problem that as the content of lead is increased the sintered titanate often has many pores in its surfaces and hence lacks practicability.

One of known measures for prevention dissipation of lead oxide in sintering a compact of a powder mixture of raw materials for a lead barium titanate is covering the compact to be sintered with said powder mixture. However, this measure is not very effective when it is intended to substitute more than 40% of lead for barium in barium titanate, and by this method it is impracticable to produce, with good reproducibility, a PTC lead barium titanate ceramic having a switching temperature higher than 300° C.

JP-A No. 50-33490 proposes producing a modified lead barium titanate ceramic having PTCR by adding a small amount of Nb in the form of oxide to the raw materials to thereby suppress dissipation of lead oxide during sintering. In an example of JP-A No. 50-33490 the substitution of Pb for Ba in barium titanate reaches 80%, and the obtained PTC titanate ceramic has a switching temperature of about 420° C. However, at normal temperature the specific resistance of this titanate ceramic is as high as $5.0 \times 10^4$ $\Omega \cdot cm$, and the maximum increase in resistivity by the PTCR effect is barely by two figures. Such characteristics do not fully meet practical requirements.

JP-A 60-258901 proposes producing a PTC barium lead titanate sufficiently high in the content of lead by using a metal salt of an organic acid, such as oxalic acid, as the source of lead in raw materials to thereby prevent loss of lead during sintering. However, the obtained titanate ceramic is not high in PTCR and is liable to deteriorate by repeated application of voltages thereto.

It is well known that a modified lead barium titanate ceramic represented by $(Ba_{1-x-y}Sb_yPb_x)TiO_3$ has PTCR with a switching temperature higher than 300° C. when the value of x is 0.6 or greater (y is up to about 0.1). However, when such a modified lead barium titanate ceramic is produced by any of known methods the product becomes worse in PTCR characteristics than expectation and//or easily deteriorates by repeated application of voltages thereto.

SUMMARY OF THE INVENTION

It is an object of the present invention to provide an industrially practicable method for stably producing a modified lead barium titanate ceramic, which is sufficiently high in the content of lead and has a high PTCR with a switching temperature ranging from about 350° C. to about 450° C. and hence serves as the material of medium-to-high temperature PTC thermistors.

According to the invention there is provided a method of producing a modified lead barium titanate ceramic which has a fundamental composition represented by the general formula $(Ba_{1-x-y}Sb_yPb_x)TiO_3$, where x is not greater than 0.9 and y is from 0.001 to 0.1, and has a positive coefficient of resistivity over a range of temperature higher than about 350° C. at the lower boundary, the methods comprising the step of preparing a mixture of metal-oxygen compounds, which are sufficient as the sources of Ba, Pb, Sb and Ti in the titanate ceramic and include as the source of Pb in the titanate ceramic a lead-containing compound obtained by thermal decomposition of a metal salt of an organic acid, and at least one additive selected from $BaCO_3$, $SiO_2$, BN and $TiO_2$, compacting the resultant mixture into a desired shape, and sintering the compacted mixture in an oxidizing atmosphere.

As the metal salt of organic acid, lead titanate salt of oxalic acid is preferred. The oxalate, or an alternative organic acid salt, is thermally decomposed to dissipate the organic component either in advance or after mixing it with the other materials of the modified lead barium titanate ceramic. It is preferable to jointly use lead titanate salt of oxalic acid and barium titanate salt of oxalic acid to provide the entirety of Pb, Ba and Ti of the desired titanate ceramic.

By a joint effect of using a metal salt of an organic acid as the source of lead and adding at least one suitable additive to the raw materials, the sintering in the method according to the invention is achieved without allopwing lead to exist in the form of free lead oxide and consequently with little dissipation of lead. By this method it is popssible to produce a modified lead barium titanate ceramic having a fundamental composition of the above general formula with a sufficiently high content of Pb and with good reproducibility, and it is possible to obtain a titanate ceramic which is sufficiently high in relative density and has a high PTCR over a certain range of temperature. The lower boundary of that range of temperature is between about 350° C. and about 450° C., and the width of the range is from about 50° C. to about 100° C. The obtained titante ceramic is good in durability, in respect of its PTCR characteristice, against repeated heating or application of voltages and provides a PTC thermistor functioning at medium-to-high temperatures.

DESCRIPTION OF THE PREFERRED EMBODIMENTS

Figure 1:
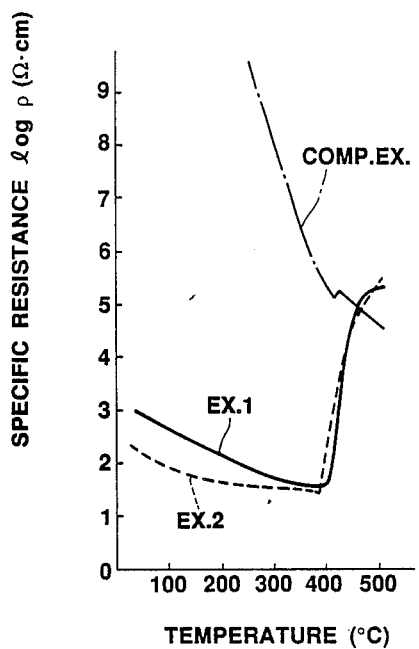
FIG. 1 is a graph showing temperature-resistivity characteristics of modified lead barium titanate ceramics obtained in two examples of the invention and a comparative example.

The fundamental composition of a modified lead barium titanate ceramic to be produced by the method according to the invention is $(Ba_{1-x-y}Sb_yPb_x)TiO_3$, where x is not greater than 0.9 and y is from 0.001 to 0.1. It is suitable that x in the general formula is not smaller than 0.6.

As the source of Pb in the above general formula it is prefered to use $PbTiO(C_2O_4).4H_2O$ or, if $(Ba_{1-x}Pb_x)TiO(C_2O_4)_2.4H_2O$. Also it is preferred to use $BaTiO(C_2O_4)_2.4H_2O$ as the source of Ba in the general formula. As the source of Sb it is preferred to use $Sb_2O_3$. The oxalates are decomposed by calcination before or after mixing with $Sb_2O_3$ and at least one of $BaCO_3$, $SiO_2$, BN and $TiO_2$.

It is rather preferable to decompose the oxalates by calcining the mixture of all the materials of the modified lead barium titanate, including the selected additive(s). As to the calcination temperature a suitable range is from about 500° to 900° C. The calcination can be accomplished in the air, but the concentration of oxygen in the calcining atmosphere may be decreased by dilution with a suitable gas to avoid very rapid decomposition and combustion of the oxalates. If the calcination temperature is lower than 500° C. the decomposition of the oxalates will be incomplete, and incompleteness of the decompostion will subsequently cause cracking of the compact of the raw mixture subjected to sintering and/or insufficient density of the sintered titanate. If the calcination temperature is above 900° C. there arises a possibility of undesirable growth of oxide particles, and often the calcined particles undergo partial sintering and become worse in lubricity at the subsequent compacting operation.

After calcination the powdery mixture of the raw materials is compacted into a desired shape. According to the need a small of amount of a binder may be used, and the powdery mixture may be granulated to facilitate the compacting operation. The compacted mixture is sintered in an oxidizing atmosphere, which may be the air, at 1000°–1200° C. usually for 0.5–2 hr. The raw mixture prepared through the above described calcination treatment is good in sinterability. Therefore, the sintering can be accomplished without suffering from abnormal growth of particles though care should be taken not to excessively rapidly raise the temperature and not to make nonuniform heating.

As the additive(s) according to the invention, any of or any combination of $BaCO_3$, $SiO_2$, BN and $TiO_2$ can be employed. In general these additives are effective for suppressing dissipation of lead during sintering, shortening the sintering time, increasing relative density of the sintered titanate ceramic above about 80%, decreasing the resistance of the sintered titanate ceramic at normal temperature, improving PTCR characteristics of the sintered titanate ceramic and reducing deterioration of the PTCR characteristics of the sintered titanate ceramic by repeated heating or application of voltages. When x (Pb) is the general formula of the fundamental composition is greater than 0.6 the addition of $BaCO_3$ is very effective for suppression of dissipation of lead during sintering and also for compensation of the A-site of the lead barium titanate. The addition of $SiO_2$ or BN is very effective for prevention of deterioration of the titanate ceramic in respect of its PTCR characteristics. $TiO_2$ is particularly effective for decreasing the resistance of the titanate ceramic at normal temperature.

However, any of these additives should not be used in an unnecessarily large quantity. On the basis of the fundamental composition of the modified lead barium titanate, $(Ba_{1-x-y}Sb_yPb_x)TiO_3$, it is preferred to add 0.01–1.0 atom% of $BaCO_3$, 0.01–2.0 atom% of $SiO_2$, 0.01–4.0 atom% of BN and/or 0.01–1.0 atom% of $TiO_2$. The addition of more than 1.0 atom% of $BaCO_3$, more than 2.0 atom% of $SiO_2$ or more than 4.0 atom% of BN is liable to result in that lead oxide is present in the sintered ceramic and that due to the presence of lead oxide the sintered ceramic is not very uniform in its structure and is brittle and susceptible to minute cracking. The addition of more than 1.0 atom% of $TiO_2$ results in a considerable lowering of the switching temperature above which the titanate ceramic has PTCR.

The invention is further illustrated by the following nonlimitative examples.

EXAMPLE 1

As the principal raw materials of a lead barium titanate containing a small amount of antimony, $BaTiO(C_2O_4)_2.4H_2O$ of 99.9% purity and $PbTiO(C_2O_4)_2.4H_2O$ of 99.9% purity, each of which was prepared by an oxalate process and was smaller than 1 μm particle size, and $Sb_2O_3$ in fine powder form were used in quantities appropriate for the intended fundamental composition of $(Ba_{0.298}Sb_{0.002}Pb_{0.7})TiO_3$. In addition, $BaCO_3$ powder amounting to 0.6 atom% of the fundamental composition and $SiO_2$ powder amounting to 0.2 atom% of the fundamental composition were used.

These raw materials were subjected to wet mixing in a ball mill for 6 hr. The mixture was separated from water and dried, and the dry mixture was calcined at 600° C. for 2 hr. The calcined powder mixture was granulated with addition of 2 wt% of an organic binder, and the granulated material was compacted under pressure of 1000 kh/cm² into discs 10 mm in diameter and 2 mm in thickness. The disc were sintered in an electric furnace at 1150° C. for 30 min.

EXAMPLE 2

The process of Example 1 was repeated except that $TiO_2$ powder amounting to 0.2 atom% of the fundamental composition (the same as in Example 1) and BN powder amounting to 0.6 atom% of the fundamental composition were added together with the $BaCO_3$ and $SiO_2$ powders.

COMPARATIVE EXAMPLE

The process of Example 1 was repeated except that neither $BaCO_3$ nor $SiO_2$ was added to the principal raw materials. No alternative additive was used. The fundamental composition of titanate was unchanged.

The sintered titanate discs of Examples 1 and 2 and Comparative Example were subjected to measurement of specific resistances at various temperatures to determine temperature coefficients of resistance. The results are shown in FIG. 1.

As can be seen in FIG. 1, the lead barium titanate of Comparative Example did not possess PTCR though oxalates were used as raw materials. In the case of Example 1 wherein $BaCO_3$ and $SiO_2$ were added to the principal raw materials, the sintered titanate was remarkably lower in resistivity at normal temperature and possessed very good PTCR. At temperatures above the Curie point there occurred a sharp increase in resistivity by 3.5 figures at the maximum. In Example 2 wherein $TiO_2$ and BN were added besides $BaCO_3$ and $SiO_2$, the resistivity at normal temperature further decreased by about one figure so that the difference in resistivity between normal temperature and Curie point because small, and at higher temperatures the resistivity increased more steeply than in Example 1.

Figure 2:
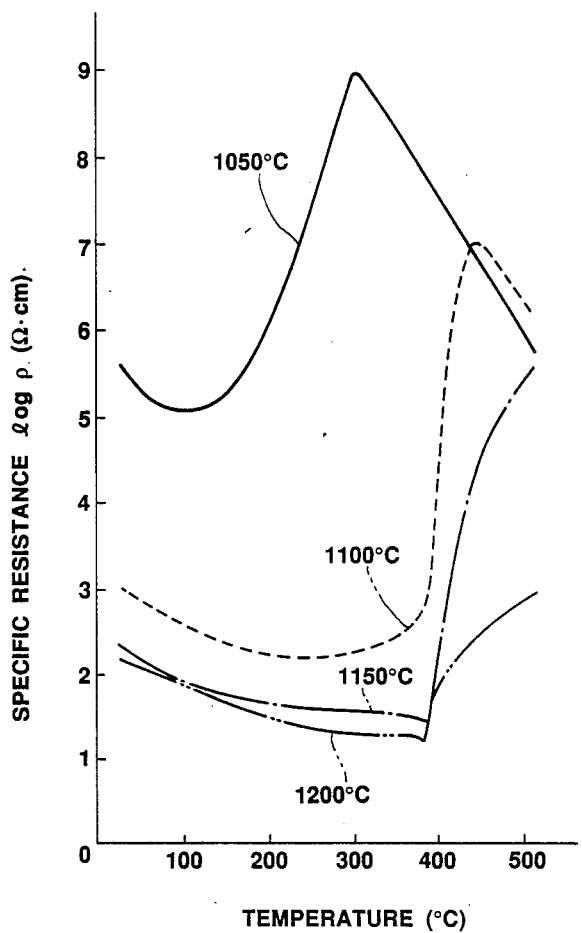
FIG. 2 is a graph showing the influence of the sintering temperature in an example of the invention on the temperature-resistivity characteristic of the obtained modified lead barium titanate ceramic.

To examine the influence of the sintering temperature on the temperature-resistivity characteristic of the obtained titanate ceramic, the process of Example 2 was repeated by varying the sintering temperature over the range from 1050° C. to 1200° C. The results are shown in FIG. 2.

Figure 3:
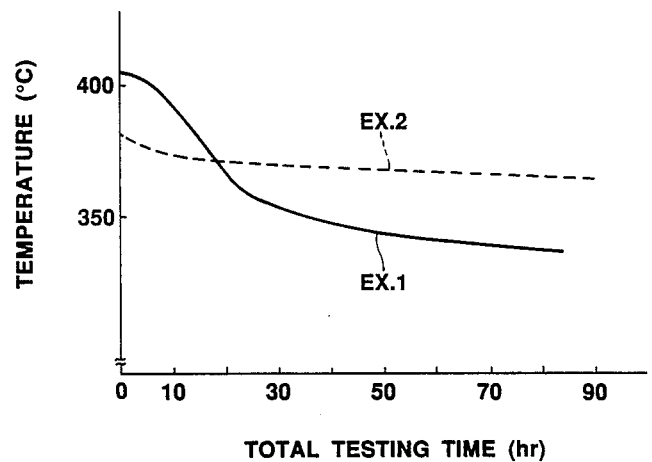
FIG. 3 is a graph showing the results of a durability test on modified lead barium titanate ceramics obtained in two examples of the invention.

The sintered titanates of Examples 1 and 2 were subjected to a durability test, in which a constant voltage was repeatedly applied to each sample to examine any change in the heat-generating ability of the sample with incresed in the total time of voltage application. That is, a voltage of 30 V was applied to each sample for 5 min while measuring the temperature of the sample, and the application of the voltage was interrupted for the following 3 min. This 8-min treatment was successively cycled many times. The results were as shown in FIG. 3. As can be seen, the sintered titanate of Example 1 exhibited some lowering of the temperature reached by heat generation at an initial stage of the repeated operation. However, in the case of Example 2 wherein $TiO_2$ and BN were added besides $BaCO_3$ and $SiO_2$ the temperature or heat generation was very stable though slight lowering of the temperature was exhibited at an initial stage of the repeated operation. The testing was continued for 90 hr, but no change was observed in the appearance of the tested samples.

EXAMPLE 3

In repeating the process of Example 1 the two kinds of additives, $BaCO_3$ and $SiO_2$, were replaced by only one kind of additive selected from $BaCO_3$, $SiO_2$, BN and $TiO_2$, and the amount of the additive was variously changed as shown in the following table. The fundamental composition of titanate, $(Ba_{0.298}Sb_{0.002}Pb_{0.7})TiO_3$, was kept unchanged.

The sintered titanates were subjected to measurement of specific resistance at various temperatures to determine the switching temperatures ($T_s$), resistivity at the switching temperature and the ratio of the maximum resistivity ($\rho_{max}$) to the minimun resistivity ($\rho_{min}$). The results are shown in the table.

Figure 4:
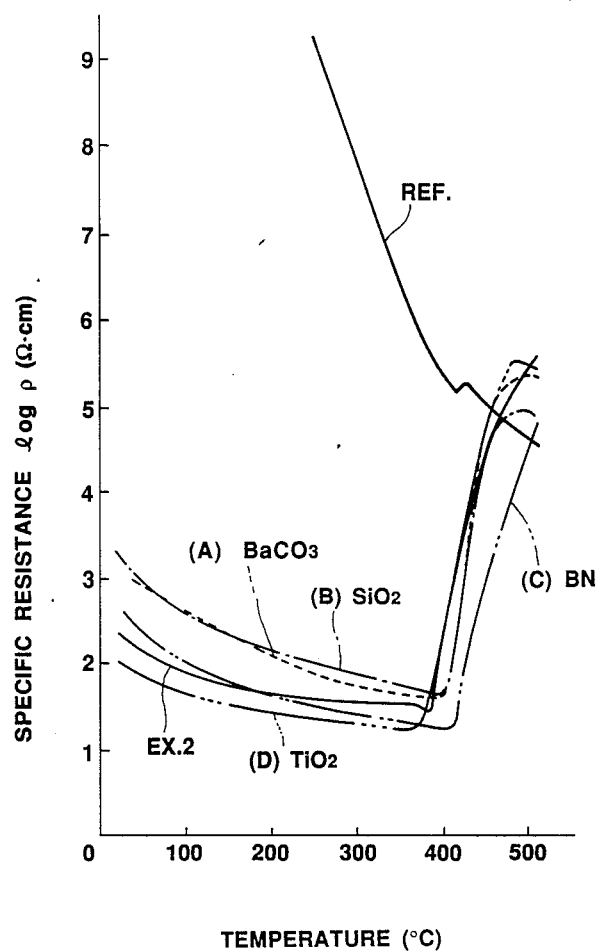
FIG. 4 is a graph showing the results of an experiment about the effects of the additives according to the invention on the temperature-resistivity characteristics of the obtained lead barium titanate ceramics.

With respect to representatives of the sintered titanates of Example 3, FIG. 4 shows the temperature-resistivity resistivity characteristics. FIG. 4 curve (A) represents the addition of 0.6 atom% of $BaCO_3$, curve (B) the addition of 0.6 atom% of $SiO_2$, curve (C) the addition of 0.6 atom% of BN and curve (D) the addition of 0.2 atom% of $TiO_2$. Curve "REF." represents the sintered titanate of Comparative Example wherein no additive (other than $Sb_2O_3$) was used, and curve "EX.2" represents Example 2 wherein the four kinds of additives were jointly used.

| Additive (atom %) | | Relative Density (%) | Resistivity at 25° C. log $\rho$ ($\Omega \cdot$ cm) | Switching Temp. $T_s$ (°C.) | Resistivity at $T_s$ log $\rho$ ($\Omega \cdot$ cm) | $\frac{\rho_{max}}{\rho_{min}}$ | Note |
|---|---|---|---|---|---|---|---|
| $BaCO_3$ | 0.2 | 69.1 | 9.2 | 410 | 6.3 | 0.1 | curve (A) |
| | 0.6 | 83.3 | 4.2 | 413 | 2.8 | 3.4 | |
| | 1.0 | 88.0 | 2.9 | 418 | 1.9 | 3.9 | |
| | 3.0 | — | — | — | — | — | *1 |
| $SiO_2$ | 0.2 | 89.2 | 3.00 | 398 | 1.7 | 3.50 | curve(B) |
| | 0.4 | 84.9 | 3.33 | 400 | 1.8 | 3.75 | |
| | 0.6 | 79.1 | 2.50 | 383 | 1.45 | 3.95 | |
| | 1.0 | 85.5 | 3.28 | 415 | 1.68 | 3.10 | |
| | 3.0 | 86.5 | 9 | 415 | 5.08 | 0.6 | |
| BN | 0.2 | 87.2 | 2 | 408 | 1.1 | 3 | curve(C) |
| | 0.4 | 86.9 | 2.5 | 408 | 1.35 | 3.5 | |
| | 0.6 | 83.9 | 2.5 | 408 | 1.3 | 3.5 | |
| | 1.0 | 82.3 | 2.4 | 408 | 1.28 | 3.5 | |
| | 2.0 | 80.5 | 3.5 | 408 | 1.6 | 3.9 | |
| | 4.0 | 77.4 | 4 | 408 | 2.1 | 3.6 | |
| $TiO_2$ | 0.2 | 84.9 | 1.88 | 375 | 1.25 | 4.1 | curve(D) |
| | 0.4 | 83.8 | 2.55 | 370 | 1.5 | 4.05 | |
| | 0.6 | 79.9 | 3.75 | 365 | 2.2 | 3.4 | |
| | 1.0 | 85.8 | 4.55 | 383 | 2.45 | 3.1 | |
| | 3.0 | — | — | — | — | — | *2 |

*1 excessively sintered
*2 almost dielectric

As shown in FIG. 1 and FIG. 4 (curve REF.), in Comparative Example using none of $BaCO_3$, $SiO_2$, BN and $TiO_2$, the sintered titanate was almost dielectric at normal temperature and could be regarded as having negative temperature coefficient of resistance even at 300°–500° C. As can be seen in the Table and FIG. 4 (curve (A) ), when $BaCO_3$ was added to the principal raw materials the sintered titanate became remarkably lower in resistivity at normal temperature and exhibited a sharp rise in resistivity at temperatures slightly above 400° C. In this case the maximum increase in resistivity was by 3.3 figures. The addition of $SiO_2$ (curve (B) in FIG. 4) had nearly the same effect on the temperature-resistivity charateristic of the sintered titanate.

When BN was added (curve (C)), normal temperature resistivity of the sintered titanate became lower than in the case of addition of $BaCO_3$ or $SiO_2$. In this case the rise of resistivity at temperatures slightly above the switching temperature was steeper than in the case of addition $BaCO_3$ or $SiO_2$, but the rate of rise in resistivity became lower as temperature is further raised. Although the measurement was continued up to 500° C. steel the rise in resistivity did not come to an end point. In the case of BN it is possible to increase the amount of addition than in the cases of the other additives.

The addition of $TiO_2$ (curve (D)) resulted in further lowering of normal temperature resistivity of the sintered titanate. At temperatures above the switching temperature the rise in resistivity was fairly steep, and the rise came to an end point before raising temperture up to 500° C.

In Example 3 good sintering was accomplished in every case where the amount of the additive was appropriate, as can be seen from the relative density values in the table.

What is claimed is:

1. A method of producing a modified lead barium titanate ceramic which has a fundamental composition represented by the general formula $(Ba_{1-x-y}Sb_yPb_x)TiO_3$, where x is not greater than 0.9 and y is from 0.001 to 0.1, and has a positive temperature coefficient of resistivity over a range of temperature higher than about 350° C. at the lower boundary, the method comprising the steps of:

preparing a mixure of metal-oxygen compounds, which are sufficient as the sources of Ba, Pb, SSb and Ti in said titanate ceramic and include as the source of Pb in said titanate ceramic a lead-containing compound obtained by thermal decomposition of a metal salts of an organic acid, and a combination of additives, said combination comprising BN amounting to 0.01–4.0 atom% of said fundamental composition and at least one other additive selected from the group consisting of $BaCO_3$, $SiO_2$ and $TiO_2$, the amount of said $BaCO_3$ being not more than 1.0 atom% of said fundamental composition, the amount of said $SiO_2$ being not more than 2.0 atom% of said fundamental composition, the amount of said $TiO_2$ being not more than 1.0 atom% of said fundamental composition;

compacting the prepared mixture into a desired shape; and sintering the compacted mixture in an oxidizing atmosphere.

2. A method according to claim 1, wherein x in the general formula is not smaller than 0.6.

3. A method according to claim 1, wherein said metal salt of an organic acid is $PbTiO(C_2O_4)_2$ or its tetrahydrate.

4. A method according to claim 3, wherein the step of preparing said mixture comprises the sub-steps of preparing a preliminary mixture of $PbTiO(C_2O_4)_2.4H_2O$, $BaTiO(C_2O_4)_2.4H_2O$, $Sb_2O_3$ and said at least one additive, and calcining said perliminary mixture at a temperature in the range from 500° to 900° C.

5. A method according to claim 1, wherein said compacted mixture is sintered at a temperature in the range from 1000° to 1200° C.

6. A method according to claim 1, wherein said combination of additives consists of BN, $BaCO_3$, $SiO_2$ and $TiO_2$.

* * * * *

UNITED STATES PATENT AND TRADEMARK OFFICE
CERTIFICATE OF CORRECTION

PATENT NO. : 4,960,551

DATED : OCTOBER 2, 1990

INVENTOR(S) : TAKAMITSU ENOMOTO; HIROSHI UEDA; MIDORI KAWAHARA; NOAKI OKADA; NOBORU MURATA

It is certified that error appears in the above-identified patent and that said Letters Patent is hereby corrected as shown below:

On the title page, under item [19], "Eonomoto" should be --Enomoto--; and in item [75], "Takamitsu Eonomoto" should be --Takamitsu Enomoto--.

Signed and Sealed this

Seventh Day of April, 1992

Attest:

HARRY F. MANBECK, JR.

*Attesting Officer*     *Commissioner of Patents and Trademarks*